(12) United States Patent  (10) Patent No.: US 7,542,848 B2
Ho  (45) Date of Patent: Jun. 2, 2009

(54) SOFTWARE-DEFINED GPS RECEIVERS AND DISTRIBUTED POSITIONING SYSTEM

(75) Inventor: Long V. Ho, Orange, CA (US)

(73) Assignee: The Boeing Company, Chicago, IL (US)

( * ) Notice: Subject to any disclaimer, the term of this patent is extended or adjusted under 35 U.S.C. 154(b) by 902 days.

(21) Appl. No.: 10/954,084

(22) Filed: Sep. 28, 2004

(65) Prior Publication Data

US 2006/0074554 A1    Apr. 6, 2006

(51) Int. Cl.
*G01S 5/00* (2006.01)
(52) U.S. Cl. .................................. 701/213; 709/217
(58) Field of Classification Search ............... 701/213; 709/217, 220; 370/328; 342/357.06, 357.12
See application file for complete search history.

(56) References Cited

U.S. PATENT DOCUMENTS

| 6,072,994 | A  | * | 6/2000  | Phillips et al. ............... 455/84 |
| 6,211,822 | B1 | * | 4/2001  | Dougherty et al. ..... 342/357.12 |
| 6,646,595 | B1 | * | 11/2003 | Heng et al. ............ 342/357.06 |
| 7,188,159 | B2 | * | 3/2007  | Ralston et al. ............. 709/220 |
| 7,215,651 | B2 | * | 5/2007  | Millar ........................ 370/315 |
| 2003/0226071 | A1 | * | 12/2003 | Millar ........................ 714/712 |

OTHER PUBLICATIONS

Software Communications Architecture Specification, Appendix A. Glossary,MSRC-5000SCA, Rev. 2.2, p. A thru A-10.
Software Communications Architecture Specification, Appendix B. SCA Application Environment Profile, MSRC-5000SCA, Rev. 2.2. p. B-I thru B-14.
Software Communications Architecture Specification, Appendix C. Core Framework IDL, MSRC-5000SCA, Rev. 2.2. p. C-1 thru C-82.
Software Communications Architecture Specification, Appendix D. Domain Profile, MSRC-5000SCA, Rev. 2.2. p. D-i thru D-60.
Software Communications Architecture Specification, Attachment 1 to Appendix D. Document Type Definitions for the Domain Profile, MSRC-5000SCA, Rev. 2.2. p. Attachment 1-1 thru 1-20.
Software Communications Architecture Specification, Attachment 2 to Appendix D. Common Properties Definitions, MSRC-5000SCA, Rev. 2.2. p. Attachment 2-1.
Modular Software-Programmable Radio Consortium, Software Communications Architecture Specification, MSRC-5000SCA, V2.2. Nov. 17, 2001, p. i thru 7-1.

* cited by examiner

*Primary Examiner*—Dalena Tran
(74) *Attorney, Agent, or Firm*—Yee & Associates, P.C.; Charles S. Gumpel

(57) ABSTRACT

A software-defined GPS receiver includes a hardware-oriented front end for down converting and digitizing the signals received from GPS satellites. The GPS signal processing functions, such as acquisition/tracking and navigation computing, can be performed by software running on the receiver central processing unit (CPU), rather than by firmware in a custom hardware device such as an ASIC. The signal processing capabilities of the receiver can therefore be readily reconfigured (e.g., upgraded) to accommodate changes in the satellite signal transmissions. Moreover, by utilizing an operating environment architecture and application programs that are compliant with the Software Communications Architecture (SCA) specification, a distributed positioning system of scalable, portable, and compatible SCA-compliant software-defined GPS receivers can be realized.

28 Claims, 3 Drawing Sheets

SOFTWARE-DEFINED GPS RECEIVERS AND DISTRIBUTED POSITIONING SYSTEM

TECHNICAL FIELD

The present invention generally relates to radio communications, and more particularly relates to software-defined GPS receivers.

BACKGROUND

Global positioning system (GPS) receivers are currently in widespread use for navigation and other related applications. Basically, a GPS receiver can determine its location by analyzing radio signal information received from GPS satellites orbiting the earth. GPS receivers can also be configured to communicate with other GPS receivers to form an information distribution network. For example, a military communications network can distribute location and positioning information between soldiers in field operations and a central command station. Similarly, in a commercial application such as the aviation industry, navigation information can be distributed throughout an airline network.

The signal processing and analyzing functions of a GPS receiver can be relatively complex and until recently were generally performed by customized processing hardware, such as application specific integrated circuits (ASICs). As such, a typical hardware-oriented GPS receiver can become incompatible with next generation communications technology, and may require costly upgrading or replacement or integration with other devices. In addition, hardware-oriented GPS receivers used in harsh environments, such as in military applications, typically require an extensive support system to maintain reliable component operation.

Recent efforts to overcome these disadvantages have led to the development of software-defined GPS receivers, where an embedded GPS application program can provide signal processing and analysis functionality previously performed by hardware. In the event of a change in GPS satellite signal standards, for example, a software-defined GPS receiver can be reconfigured with up-to-date software to accommodate the new satellite signal with little or no impact on the receiver hardware. With the advent of software-defined GPS receiver technology, however, the need arises for scalability, portability, and compatibility with other hardware platforms; e.g., in a network. Current software-defined GPS receivers may use individualized software architectures (i.e., stove pipe configurations) and therefore may not be able to communicate with other types of software-defined GPS receivers. As such, networking of different types of stove pipe systems might not be feasible at present.

Accordingly, it is desirable to provide a GPS receiver that is software-defined so that it can be readily upgraded with minimal hardware changes. In addition, it is desirable to provide a software-defined GPS receiver based on standardized software architecture that can provide scalability, portability, and hardware compatibility. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, devices are provided for receiving and processing GPS satellite signals. One device comprises a software-defined GPS receiver configured with a down converter circuit and an analog-to-digital converter (ADC) circuit for down converting and digitizing the received GPS satellite signals. A general-purpose processor in the exemplary receiver is configured with an operating environment architecture and application programs that process the digitized down-converted GPS satellite signals in order to compute navigation information. The operating environment architecture is based on object-oriented methodology, and is compliant with a standard open architecture framework such as the Software Communications Architecture (SCA). The operating environment architecture and application programs are reconfigurable, and can be compatible with any SCA-compliant receiver platform. Moreover, the exemplary SCA-compatible software-defined GPS receivers can be arranged in a network with service nodes for the purpose of sharing navigation information and services.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of software-defined GPS receivers. Traditional GPS receivers have generally been hardware-oriented. That is, a GPS satellite signal would typically be acquired by RF Down Converter/ADC circuitry in a GPS receiver and then processed by a custom hardware device, such as an ASIC. In an exemplary embodiment of a software-defined GPS receiver, the GPS signal processing function can be performed by software running on the receiver general-purpose central processing unit (CPU), rather than by firmware in a hardware device such as an ASIC. As such, the processing capabilities of the receiver can be readily reconfigured (e.g., upgraded) in accordance with technology changes, or for other reasons. Moreover, by utilizing a Software Communications Architecture (SCA) for a network of SCA-compliant software-defined GPS receivers, a scalable, portable, and compatible distributed positioning system can be realized.

Figure 1:
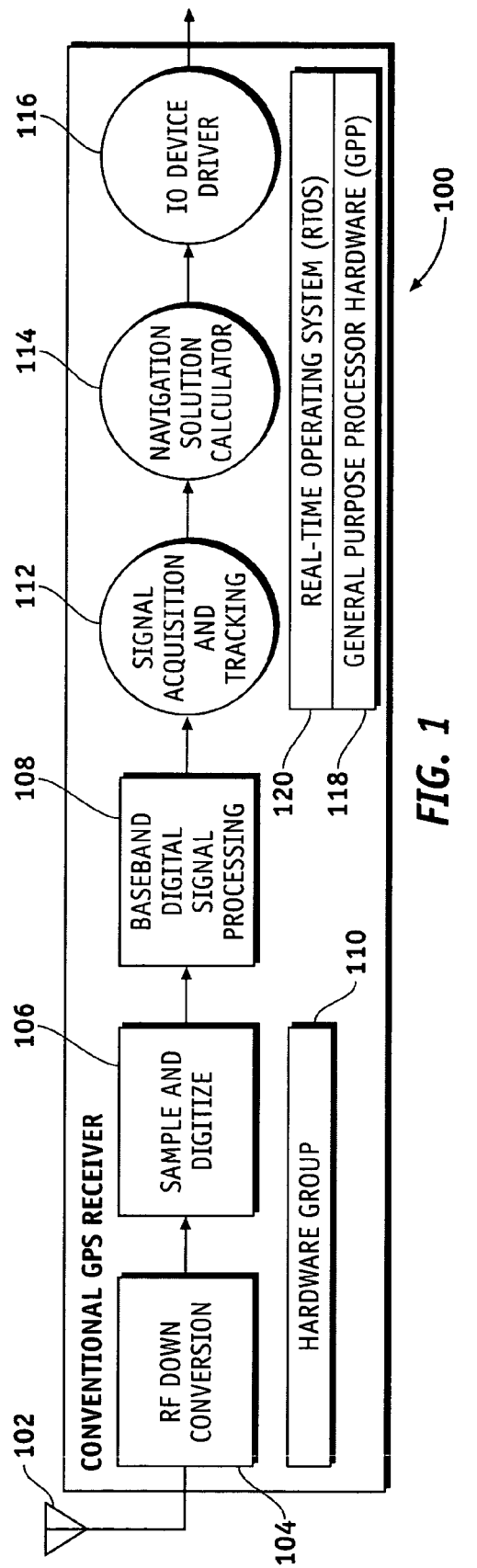
FIG. 1 is a block diagram of an exemplary hardware-oriented GPS receiver.

A simplified block diagram of a conventional type of hardware-oriented GPS receiver 100 is illustrated in FIG. 1. GPS satellite signals are typically received by an antenna 102 and routed to RF/Down Converter (RFDC) circuitry 104. The down-converted signals are then typically digitized by an analog-to-digital-converter (ADC) 106 for subsequent signal processing in a customized digital signal processor (DSP)

108 such as an ASIC. A shaded box 110 underlying the aforementioned components (RFDC 104, ADC 106, DSP108) indicates that these components are essentially hardware-oriented devices.

The output data from DSP 108 is typically further processed by a signal acquisition and tracking program 112 under the control of a real-time operating system (RTOS) 120 that is resident on a general purpose processor (GPP) 118. RTOS 120 is typically an operating system that is designed for use in "real-time" systems such as GPS. That is, an RTOS is generally designed to respond to external events within a short and predictable time frame. Current examples of RTOS are VxWork, Integrity, and LynxOS. The data derived from signal acquisition and tracking program 112 is generally directed to a navigation solution calculator program 114 that computes the geographical location of GPS receiver 100. Finally, an input-output (IO) device driver 116 typically enables the presentation of the location information on a display/readout device (not shown). The shaded box representing GPP 118 is shown underlying programs 112, 114, 116, as well as RTOS 120, to indicate that the analysis software portion of conventional GPS receiver 100 is implemented by GPP 118.

Figure 2:
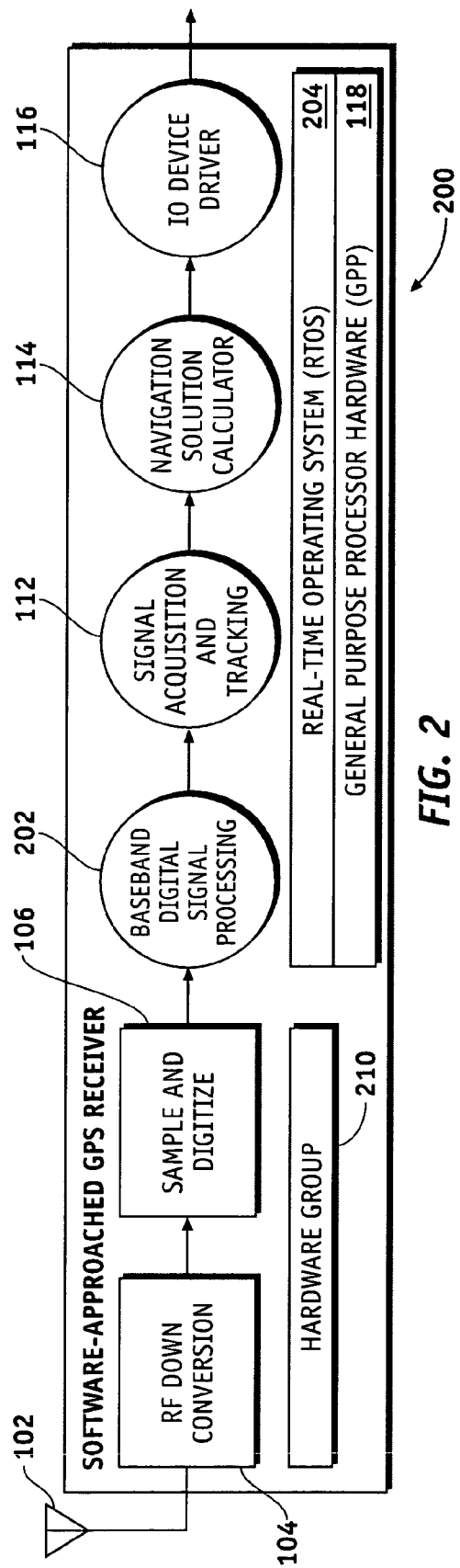
FIG. 2 is a block diagram of an exemplary software-approached GPS receiver.

A simplified block diagram of what is designated herein as a "Software-Approached" GPS receiver 200 is illustrated in FIG. 2. In this exemplary configuration, the digital signal processing function has been shifted from the hardware-oriented portion of GPS receiver 200 to the software-oriented portion. That is, DSP 202 in FIG. 2 represents software running on GPP 118 in place of the hardware device (DSP 108) in the receiver configuration of FIG. 1. The use of software for the signal processing function enables the receiver to be reconfigured for new features and services by downloading new programs rather than replacing hardware components. For large network applications such as military communications systems, for example, the advantages of software replacement over hardware replacement can be very significant.

In addition to enabling a reconfigurable receiver, a software-approached design can enhance compatibility and portability in a GPS receiver network through the use of standardized software architectures. Moreover, with the selection of appropriate standardized software, the receiver can be scalable as well. For clarity, a GPS receiver incorporating standardized software for scalability, portability, and compatibility will be designated herein as a "Software-Defined" receiver to distinguish it from the aforementioned "Software-Approached" receiver.

Figure 3:
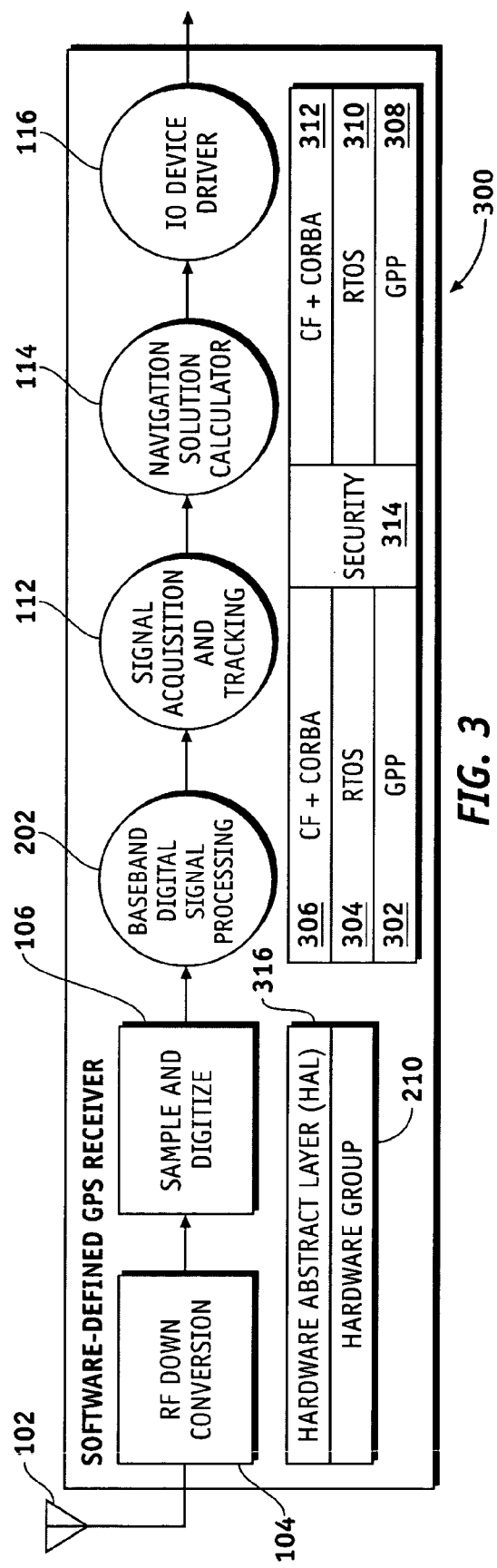
FIG. 3 is a block diagram of an exemplary embodiment of a full SCA-compliant software-defined GPS receiver.

An exemplary embodiment of a software-defined GPS receiver 300 is illustrated in the block diagram of FIG. 3. The receiver 300 front-end components (i.e., antenna 102, RFDC 104, ADC 106) are typically commercial off-the-shelf (COTS) items and can generally be used with any type of GPS receiver, such as the conventional receiver 100 of FIG. 1 or the software-approached receiver 200 of FIG. 2. Also, the signal processing and analyzing functions in this exemplary embodiment (DSP 202, signal acquisition and tracking module 112, navigation solution calculator 114, 10 device driver 116) are software-driven, in a manner similar to the software-oriented portion of receiver 200 in FIG. 2. In contrast to receiver 200, however, receiver 300 is typically configured with operating environment software that is compliant with the Software Communications Architecture (SCA) specification designated "MSRC-5000SCA, V2.2, dated Nov. 17, 2001. As defined in this SCA specification, operating environment software includes an operating system, middleware, and core framework interfaces and operations.

The SCA specification has been developed by the Joint Tactical Radio System (JTRS) Joint Program Office (JPO) of the U.S. Department of Defense to enhance the interoperability of globally deployed communication systems while also reducing development and deployment costs. The SCA is designed as an open architecture framework within which elements of hardware and software can operate in harmony. That is, the SCA defines standard interfaces that allow waveform applications to run on multiple hardware sets, where the term "waveform" in this case refers to the software-defined portion of a GPS receiver. Moreover, the SCA is designed to meet commercial application requirements as well as military applications.

In the exemplary embodiment of a software-defined GPS receiver 300 in FIG. 3, the software-oriented portion is configured in two parts, with a security barrier 314 separating the parts. In this embodiment, a GPP 302 implements an RTOS 304 via a core framework (CF) set of open application-layer interfaces and services and a common object request broker architecture (CORBA) middleware 306, while a GPP 308 implements a non-RTOS 310 via a CF and CORBA 312. The CF and CORBA architectures (306, 312) are configured to be compliant with the SCA specification. As described above, RTOS 304 denotes an operating system that responds in short and predictable time frames, while non-RTOS 310 denotes an operating system such as Microsoft Windows or Apple Macintosh. This dual configuration embodiment represents an exemplary accommodation of both secure and non-secure processing/memory allocations in compliance with the objectives of the SCA. Typically, commercial GPS receivers are designed for non-secure standard positioning service (SPS) data while military GPS receivers are generally designed for secure precise positioning service (PPS) data. The dual architecture of exemplary embodiment GPS receiver 300 is configured to accommodate both military and commercial applications within the SCA specification framework.

The SCA architecture typically enables scalability of a compliant software-defined GPS receiver because it has been developed using object-oriented methodology. That is, an "object" can be defined as a representation of a real-life entity or abstraction subject to events and behavior changes that may change the state of the object. Software modeling of object attributes can be used to represent the objects and the object behavior. In the exemplary embodiment of SCA-compliant software-defined GPS receiver 300 in FIG. 3, the software-related functions of the receiver can be decomposed into object-oriented components that interface through CORBA-capable transfers. The SCA uses CORBA (or an equivalent middleware) to enable application components to communicate with each other. These communication transfers use standardized interface definitions that allow the decoupling of software modules from each other, the isolation of the software from the hardware, and the assurance of software porting to other platforms. As such, CORBA is typically the middleware used to enable the objects to communicate with one another regardless of programming language or operating system. Moreover, the use of CORBA middleware can accommodate the evolutionary nature of technology as well as the use of COTS products. It should be noted that alternate embodiments do not necessarily require the incorporation of CORBA middleware, but rather the incorporation of a type of middleware that provides the capability of distribution in a heterogeneous environment.

The exemplary embodiment of FIG. 3 also includes a hardware abstract layer (HAL) 316 within the front-end portion of receiver 300. HAL 316 represents standardized application programming interfaces (APIs) for significant architectural blocks such as signal processing, RF interface and control, and performance monitoring. Moreover, the standardized APIs also generally include modules for handling performance parameters such as latency, throughput, jitter, and precision. The exemplary embodiment of SCA-compliant receiver 300 in FIG. 3 is shown to include HAL APIs in order to indicate that any SCA-compliant software-defined receiver "waveform" can be interfaced with a HAL API platform configuration.

Figure 4:
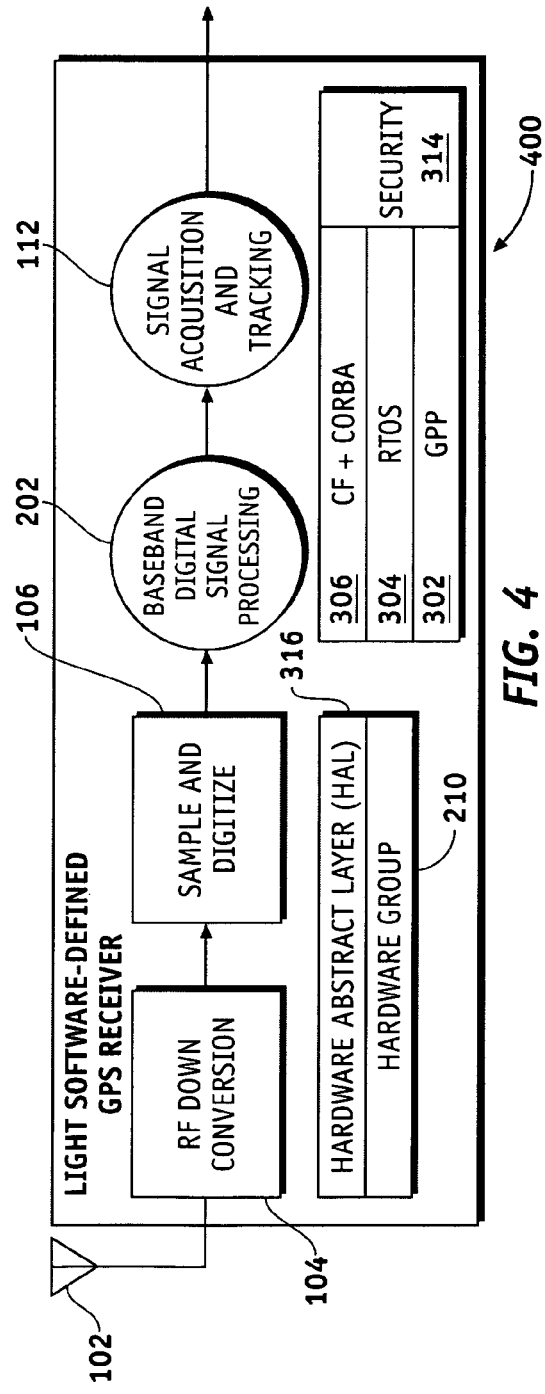
FIG. 4 is a block diagram of an exemplary embodiment of a light SCA-compliant software-defined GPS receiver.

An exemplary embodiment of a reduced-resource variant of receiver 300 is illustrated in FIG. 4 as a "Light" software-defined GPS receiver 400. In this exemplary embodiment, the navigation compute function and the IO device driver function, along with the related software, have been removed from the system. These functions are generally supplied to receiver 400 by a remote service node (not shown in FIG. 4) in communication with receiver 400. In a typical operation, receiver 400 transmits pseudo-range measurements to an associated service node for navigation computation. The service node then transmits the computed navigation information back to receiver 400. In addition, the service node may provide data to receiver 400 to aid the acquisition and tracking functions of receiver 400. Moreover, groups of receivers and service nodes can be networked to enable position awareness and collaboration among the network participants.

Figure 5:
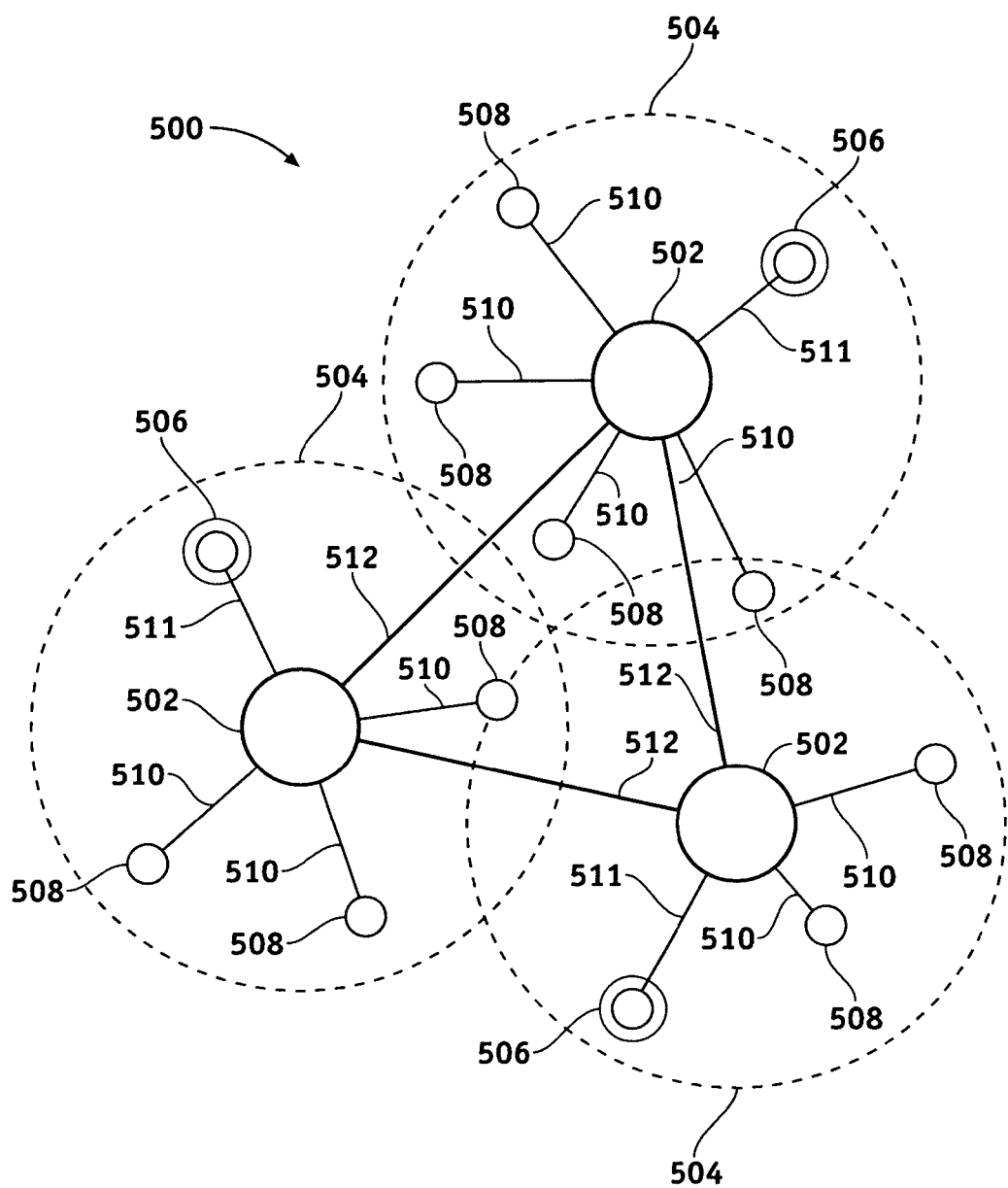
FIG. 5 is a diagram of an exemplary embodiment of a distributed positioning system for SCA-compliant software-defined GPS receivers.

One exemplary embodiment of a network 500 consisting of a group of interconnected regional service areas 504 is illustrated in FIG. 5. Each regional service area 504 typically includes a service node 502 that is capable of providing a navigation computation service to the software-defined GPS receivers 506, 508 associated with that region. In the FIG. 5 example, the receivers designated 506 represent the full-resource configuration of receiver 300 as depicted in FIG. 3. The receivers designated 508 represent the reduced-resource configuration of receiver 400 as depicted in FIG. 4. Service nodes 502 may be categorized as navigation information providers while receivers 506, 508 may be categorized as navigation information users. In this exemplary embodiment, each service node 502 typically performs navigation calculations for related reduced-resource receivers 508 via intra-regional communication links 510. In addition, each service node 502 can share navigation information via links 511 with the full-resource receivers 506, which are typically capable of computing their own navigation information. Moreover, each navigation information user can receive navigation information about a neighboring user via a database search provided by the related service node provider. Service nodes 502 are typically networked to each other via communication links 512. As such, each region 504 can share navigation information with each other region. The aforementioned communication links 510, 511, 512 can be either wired or wireless, depending on the application.

Accordingly, the shortcomings of the prior art have been overcome by providing an improved software-defined GPS receiver. In an exemplary embodiment, a hardware-oriented front end typically includes standard components for frequency down conversion and analog-to-digital conversion of the received GPS satellite signal. The remaining GPS receiver functions in the exemplary embodiment, which generally include digital signal processing, signal acquisition and tracking, and navigation computing, are typically implemented in software that is compliant with the Software Communications Architecture (SCA) standards. The use of object-oriented methodology in combination with CORBA middleware enhances the ability of the exemplary receiver to be scalable, interoperable, and portable to other platforms. As such, exemplary embodiments of the software-defined GPS receivers described herein can be deployed in GPS networks that share position awareness and navigation information.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A software-defined global positioning system (GPS) receiver, comprising:
   a down converter circuit configured to receive GPS satellite signals and to down convert a frequency of received GPS satellite signals, wherein down-converted GPS satellite signals are generated when the down converter receives the GPS satellite signals;
   an analog-to-digital converter circuit connected to the down converter circuit, wherein the analog-to-digital converter circuit is configured to sample and digitize the down-converted GPS satellite signals, wherein digitized down-converted GPS satellite signals are generated when the analog-to-digital converter circuit samples and digitizes the down-converted GPS satellite signals;
   a processor connected to the analog-to-digital converter circuit; and
   a memory connected to the processor, wherein the memory stores an operating environment architecture and an application program that, when executed by the processor, processes the digitized down-converted GPS satellite signals to compute navigation, wherein the operating environment architecture is based on object-oriented methodology, and wherein the operating environment architecture is compliant with a standard open architecture framework.

2. The software-defined GPS receiver of claim 1 wherein the standard open architecture framework is the Software Communications Architecture (SCA).

3. The software-defined GPS receiver of claim 2 wherein the operating environment architecture includes an operating system, a common object request broker architecture (CORBA) middleware, and a core framework (CF) in compliance with the SCA.

4. The software-defined GPS receiver of claim 3 wherein the operating environment architecture is reconfigurable.

5. The software-defined GPS receiver of claim 4 wherein the operating system is a real time operating system.

6. The software-defined GPS receiver of claim 4 wherein the operating system is a non- real time operating system.

7. The software-defined GPS receiver of claim 4 wherein the operating environment architecture is compatible with any SCA-compliant platform.

8. The software-defined GPS receiver of claim 7 further comprising:
   an input-output device driver connected to the processor.

9. A network of navigation information participants in a region, comprising:
   a software-defined global positioning system (GPS) receiver, comprising:

a down converter circuit configured to receive GPS satellite signals and to down convert a frequency of received GPS satellite signals, wherein down-converted GPS satellite signals are generated when the down converter receives the GPS satellite signals;

an analog-to-digital converter circuit connected to the down converter circuit, wherein the analog-to-digital converter circuit is configured to sample and digitize the down-converted GPS satellite signals, wherein digitized down-converted GPS satellite signals are generated when the analog-to-digital converter circuit samples and digitizes the down-converted GPS satellite signals;

a processor connected to the analog-to-digital converter circuit; and a memory connected to the processor, wherein the memory stores an operating environment architecture and an application program that, when executed by the processor, processes the digitized down-converted GPS satellite signals to compute navigation, wherein the operating environment architecture is based on object-oriented methodology, and wherein the operating environment architecture is compliant with a standard open architecture framework; and a service node, wherein the service node is configured to provide navigation computing services and information sharing services to the software-defined GPS receiver.

10. The network of claim 9 wherein the standard open architecture framework is the Software Communications Architecture (SCA).

11. The network of claim 10 wherein the operating environment architecture includes an operating system, a common object request broker architecture (CORBA) middleware, and a core framework (CF) in compliance with the SCA.

12. The network of claim 11 wherein the operating environment architecture is reconfigurable.

13. The network of claim 12 wherein the operating environment architecture is compatible with any SCA-compliant platform.

14. The network of claim 13 wherein the software-defined GPS receiver can share navigation information with other software-defined GPS receivers via the service node.

15. The network of claim 14 wherein the service node is in communication with one or more other networks having service nodes in communication with navigation information participants in their respective regions.

16. The network of claim 15 wherein the communicating networks are compliant with the SCA standards.

17. The network of claim 16 wherein the service node of each communicating network enables its respective navigation information participants to share navigation information with the navigation information participants of the other communicating networks via their respective service nodes.

18. The network of claim 17 wherein information sharing within a region is done via wired links.

19. The network of claim 17 wherein communication between network regions is done via wired links.

20. The network of claim 17 wherein information sharing within a region is done via wireless links.

21. The network of claim 17 wherein communication between network regions is done via wireless links.

22. A method comprising:

receiving a global positioning system (GPS) satellite signal;

down converting a frequency of the GPS satellite signal to a down converted GPS satellite signal;

sampling and digitizing the down converted GPS satellite signal, wherein a digitized down converted GPS satellite signal is generated; and processing the digitized down converted GPS satellite signal to compute navigation, wherein processing is performed using only software executing on a processor, wherein the software comprises an operating environment architecture and an application, wherein the operating environment architecture is based on object-oriented methodology that is compliant with a standard open architecture framework, and wherein the application comprises instructions for processing the digitized down converted GPS satellite signal to compute the navigation.

23. The method of claim 22 wherein the standard open architecture framework is the Software Communications Architecture (SCA).

24. The method of claim 23 wherein the operating environment architecture includes an operating system, a common object request broker architecture (CORBA) middleware, and a core framework (CF) in compliance with the SCA.

25. The method of claim 24 wherein the operating environment architecture is reconfigurable.

26. The method of claim 25 wherein the operating system is a real time operating system.

27. The method of claim 25 wherein the operating system is a non-real time operating system.

28. The method of claim 25 wherein the operating environment architecture is compatible with any SCA-compliant platform.

* * * * *